United States Patent [19]

Starin et al.

[11] Patent Number: 5,312,545

[45] Date of Patent: May 17, 1994

[54] FUEL FILTERING DEVICE

[76] Inventors: Ronald H. Starin, 122 Westwood Cir., Roslyn Heights, N.Y. 11577; Augusto F. Avila, 19 Robinson Ave., Glen Cove, N.Y. 11542

[21] Appl. No.: 59,053

[22] Filed: May 7, 1993

[51] Int. Cl.⁵ ............................................. B01D 35/02
[52] U.S. Cl. .................................. 210/172; 210/463; 220/86.2
[58] Field of Search ............ 210/117, 136, 172, 416.4, 210/463; 220/86.2, 86.3

[56] References Cited

U.S. PATENT DOCUMENTS

| | | | |
|---|---|---|---|
| 1,976,975 | 10/1934 | Williams | 220/86.2 |
| 2,010,445 | 8/1935 | Sparks | 210/172 |
| 2,145,759 | 1/1939 | Fellows et al. | 210/172 |
| 2,524,313 | 10/1950 | Gerling | 220/86.2 |
| 2,800,231 | 7/1957 | Hicks | 210/463 |
| 3,478,922 | 11/1969 | Mole | 220/86.2 |
| 3,911,977 | 10/1975 | Berger | 220/86.2 |
| 4,248,279 | 2/1981 | Warmbold | 220/86.2 |
| 4,265,752 | 5/1981 | O'Banion | 210/172 |
| 4,908,130 | 3/1990 | Lynne | 210/172 |

*Primary Examiner*—Stanley S. Silverman
*Assistant Examiner*—Robert James Popovics
*Attorney, Agent, or Firm*—Helfgott & Karas

[57] ABSTRACT

A fuel filtering device is provided for insertion within a fuel inlet aperture of a motor vehicle fuel tank. The device includes a thin metal tube having a filtering mesh covering the inserted end of the tube. A fume reducing barrier is supported across the interior of the tube by a resilient thin metal strip attached to the device at or near the opposite open end of the tube. An opening is formed in the body of the tube to enable the barrier to swing outwardly beyond the exterior of the tube against the resilient force of this strip when a fuel filling nozzle is inserted within the tube beyond the barrier. The device also has means for preventing the withdrawal of the device through the fuel inlet aperture of the motor vehicle when a previously inserted nozzle is withdrawn from within the device.

12 Claims, 3 Drawing Sheets

FUEL FILTERING DEVICE

FIELD OF THE INVENTION

This invention relates to fuel filtering devices for insertion within the fuel inlet apertures of fuel storage tanks, and more particularly to gasoline filtering devices for insertion and retention within the inlet apertures of motor vehicle gasoline tanks.

BACKGROUND OF THE INVENTION

Such filtering devices are used to prevent dirt or other impurities which may be present in a source of fuel from entering a fuel storage tank while the tank is being filled from the fuel source. This is particularly important for fuel storage tanks of motor vehicles since such dirt or impurities can enter the fuel system of the vehicle and block the operation of carburetors, fuel injectors, etc. of the vehicle.

Several problems have been encountered in providing such motor vehicle fuel filtering devices, particularly if the motor vehicle is intended to be operated by unleaded fuel and the filtering device is intended to remain in the vehicle and continue to be effective for successive fueling operations.

With the introduction of unleaded gasoline, for example, the diameter of the gasoline tank inlet aperture of the vehicle has generally been restricted by law to a diameter only slightly larger than the unleaded gasoline pump nozzle in order to prevent entry of a larger diameter leaded gasoline pump nozzle. The body of the filtering device must, therefore, be very thin in order to permit insertion and withdrawal of the unleaded gasoline nozzle from a filtering device previously inserted through this only slightly larger diameter inlet aperture. This will, of course, also be true with leaded gasoline if the leaded gasoline inlet aperture is made only slightly larger than the leaded gasoline pump nozzle.

In addition, the gasoline tank inlet aperture of a motor vehicle is also required by law in many jurisdictions to have a spring loaded cap or barrier closing the aperture, except during nozzle insertion, to reduce the gasoline fumes escaping from the gasoline tank. Consequently, any filtering device which opens this spring loaded cap, and is intended to remain within the gasoline inlet aperture after the filling operation, must likewise have a spring loaded barrier to close its own passageway and reduce the gasoline fumes from escaping therethrough.

Furthermore, the gasoline filling passageways of the vehicle leading to and/or from the actual gasoline tank inlet aperture may assume different lengths and diameters which may be close to the sides or top of an inserted filtering device and thus inhibit the operation of any fume reducing barrier or handle means of the filtering device.

SUMMARY OF THE INVENTION

Accordingly, one important object of the invention is to provide a fuel filtering device which may be inserted through and retained within the fuel inlet aperture of a vehicle and which is thin enough to accommodate the insertion and withdrawal of a fuel filling nozzle but yet is strong enough to withstand many such insertions and withdrawals without damage.

Another object of the invention is to provide fuel filtering device which has a spring loaded barrier across its passageway to inhibit the escape of gasoline fumes while the filtering device is retained within the gasoline inlet aperture of a motor vehicle.

Another object of the invention is to provide a fuel filtering device which has a nozzle-accommodating spring loaded barrier across its passageway, but the device is prevented from removal from within the gasoline inlet aperture of a motor vehicle until after the nozzle has been withdrawn from the device.

A further object is to provide a fuel filtering device which can be inserted through a gasoline inlet aperture of a motor vehicle and be operable within a gasoline tank passageway whose diameter is not much greater than that of the gasoline inlet aperture.

A still further object is to provide a filtering device which has a handle for enabling insertion and withdrawal of the device though a gasoline inlet aperture of a motor vehicle but which handle can be adjusted to not interfere with the insertion of a nozzle or with an adjacent cover of a passageway leading to the gas inlet aperture.

In general, the fuel filtering device of the invention comprises a thin metal tube having one open end for admission of a nozzle and having its other end covered by a filtering means. The outer diameters of the tube and filtering means are slightly less than the diameter of the fuel inlet aperture of the fuel tank to be filled in order to permit their insertion therethrough. An opening is formed in the body of the tube and a fume reducing barrier member normally extends across and blocks the interior passageway of the tube immediately proximate to this opening. A thin flexible and resilient metal strip extend parallel to the axis of the tube and has one end attached to the tube near or at the tube's open end and has its other end attached to and constituting the sole support of the barrier member in its normal at rest position across the interior of the tube. The opening in the body of the tube is made large enough to permit the outward swinging movement of the barrier member beyond the exterior of the tube against the resilient force of the flexible metal strip when a nozzle is inserted within the tube to a depth beyond the barrier.

The barrier member is preferably formed of a thin metal disk, and this disk and the thin flexible metal strip are preferably integrally formed from a single piece of spring steel with the disk making an obtuse angle with the metal strip. The disk will thus be supported across the interior of the tube by the strip at an obtuse angle relative to the axis of the tube, thereby facilitating the entry of a nozzle which pushes the disk aside as it moves past the disk. Because of this obtuse angle, the disk has an oval rather than a circular shape in order to substantially close the interior passageway of the metal tube when the disk is in its normal at rest position. In addition, because the flexible metal strip is the sole support of this oval disk, the obtuse angle between them may increase as the barrier is pushed aside by the insertion of a nozzle. It may be even further increased without damage to the device if the joint between the strip and the disk encounters the wall of a passageway leading to the fuel tank.

In accord with further features of the invention, a metal collar surrounds the open end of the tube to strengthen the tube and to limit the depth of insertion of the filtering device through the fuel tank inlet aperture. The tube preferably also has an open channel axially extending from this collar whose width is slightly larger than the width of the disk-supporting flexible metal strip, and this metal strip fits within this channel and is attached to the collar. This allows the exterior dimension of the filtering device not to exceed the diameter of the aperture through which it is inserted despite the presence of this metal strip. A metal loop is also preferably pivotally attached to the collar and functions as a handle for insertion and withdrawal of the device, which handle may be pivoted out of the way thereafter.

Means are also provided to prevent the filtering device from being unnecessarily withdrawn through the fuel inlet aperture together with a previously inserted nozzle. Unless prevented from doing so, this may also cause the rim of the fuel inlet aperture to hit and damage the barrier-supporting metal strip. Such withdrawal prevention means preferably comprises a pair of internally inclined flexible L-shaped members attached to the collar whose legs are forced by the insertion of a nozzle to pass through corresponding small openings in the metal tube and to extend beyond the exterior of the tube. As the nozzle is thereafter withdrawn, the externally extending legs of these L-shaped members immediately hook under the rim of the fuel inlet aperture to prevent the device from being withdrawn together therewith.

In order normally to retain the filtering device within the fuel inlet aperture but yet permit the withdrawal of the device for replacement or clean-out, outwardly projecting dimples are preferably also formed in the metal tube adjacent its open end. These dimples will press against the rim of the fuel inlet aperture to inhibit but not prevent the insertion and withdrawal of the device.

The filtering means which covers the inserted end of the filtering device may conveniently comprise a cylindrical plastic frame having large windows therein covered by a filtering material, such as a nylon or metal mesh material. The thickness of the plastic frame is made great enough to prevent a nozzle from being inserted within the device beyond the top of the frame, thereby protecting the filtering mesh material from being torn by the penetrating nozzle.

BRIEF DESCRIPTION OF THE DRAWING

The novel features of the invention are set forth in the appended claims. The invention itself, together with any further objects and advantages thereof, may be better understood by reference to the following description, taken in conjunction with the accompanying drawings in which:

DESCRIPTION OF THE INVENTION

Figure 1:
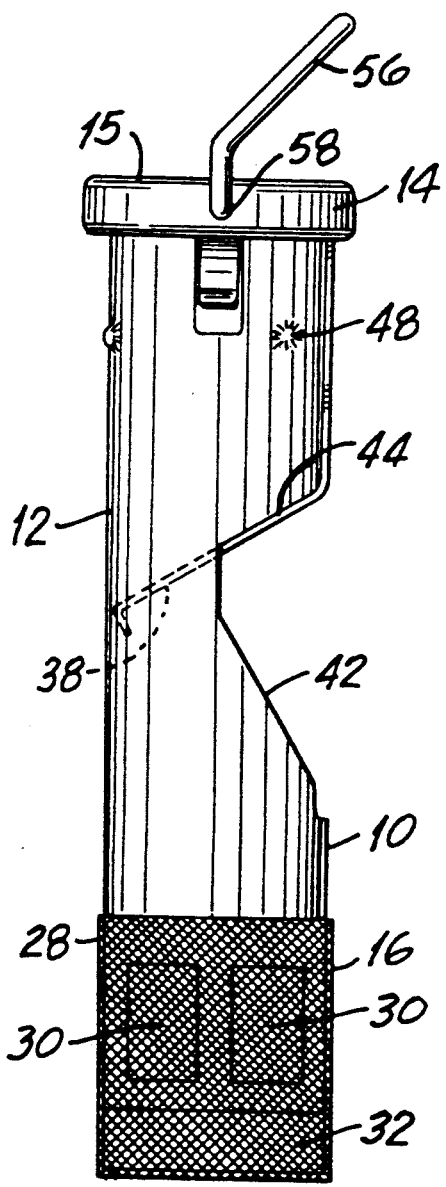
FIGS. 1 & 2 are corresponding rectilinearly arranged side views of a filtering device embodying the invention.
Figure 2:
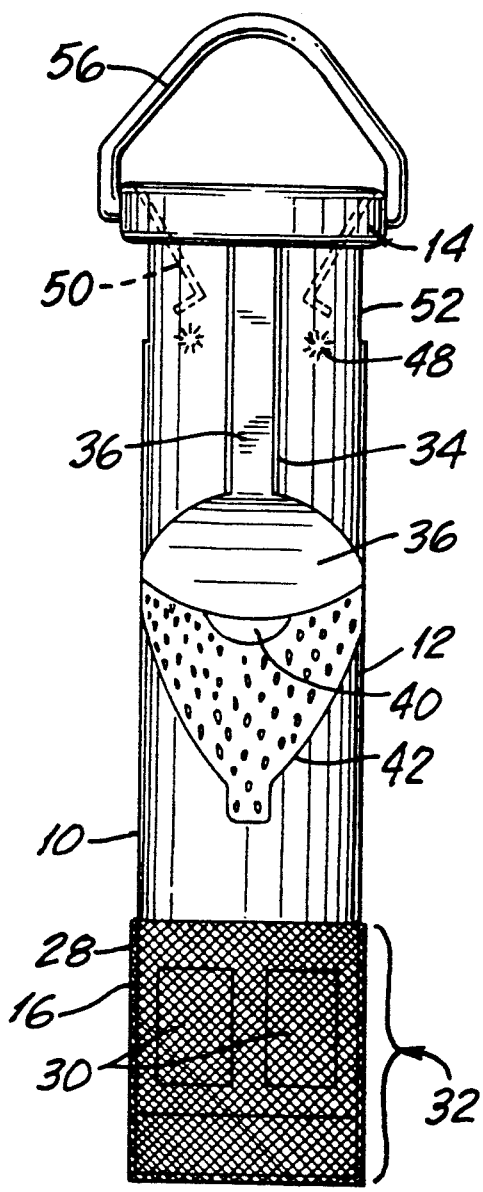

Referring to the drawings, one embodiment of a fuel filtering device 10 in accord with the invention is shown as adapted for use in a gasoline inlet aperture of a motor vehicle. Device 10 comprises a thin metal tube 12, preferably of electrolytic nickel plated steel, having an outwardly projecting collar 14, preferably also of metal, secured around one open end 15 of tube 12, and a fuel filtering means 16 secured to and covering the other end of tube 12. Metal tube 12 has an outer diameter slightly less than the diameter of a circular gasoline inlet aperture 18 in a wall 20 of a gasoline storage tank (not shown), or of a passageway 21 (FIG. 5) leading to the storage tank, of a vehicle. The inner diameter of tube 12 is slightly greater than the outer diameter of the gasoline filling nozzle 22 of a hose from a source of fuel (not shown), such as a gasoline pump. Tube 12 is thus made thin enough to fit within the space between the nozzle 22 and the rim 19 of wall 20 defining the inlet aperture 18.

The outer diameter of collar 14 is made larger than the diameter of gasoline inlet aperture 18 so that it rests against the rim 19 of aperture 18 when the filtering device 10 is fully inserted therethrough. The vehicle may also have an additional nozzle-guiding inlet passageway 23 (FIG. 3) attached to gasoline tank wall 20. This inlet passageway is normally closed by a screw-down cap 24 and may be considerably longer than shown.

As is usually required for most vehicles, the inlet aperture 18 must be covered except while a gasoline filling nozzle is inserted therethrough. One spring loaded aperture covering means is shown, for example, in FIG. 3, as comprising a metal disk 25 having the same diameter as aperture 18. Disk 25 is attached by a flexible spring steel strip 26 to the interior of tank wall 20 so as to normally hold disk 25 in a position closing the aperture 18. When a nozzle 22 is inserted within aperture 18 or when the filtering device 10 is inserted within aperture 18, as shown in FIG. 3, the disk 25 will be pushed downward and aside against the biasing force of flexible strip 26.

Fuel filtering means 16 may be a cylindrical ring coaxially attached to the other end of tube 12 and having large windows 30 in the circumference thereof so as to constitute an open supporting frame for a thin filtering mesh 32, such as a Nylon monofilament mesh, which completely covers the side and bottom exterior surfaces of ring 28. Ring 28 is preferably made of rigid plastic material and has a thickness considerably greater than that of metal tube 12 so that the inner diameter of ring 28 is less than the outer diameter of nozzle 22. Ring 28 will thus constitute a stop for nozzle 22, preventing the insertion of nozzle 22 beyond the top surface of ring 28, thereby protecting the portion of filtering mesh 32 across the bottom of ring 28 from being torn by a deeper penetration of nozzle 22.

Figure 4:
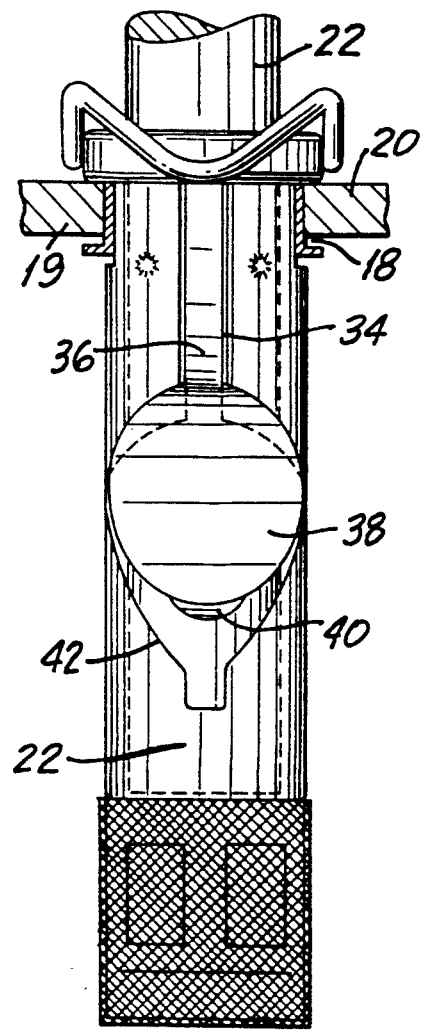

In accord with the invention, tube 12 has a narrow axially extending open channel 34 in the top portion of tube 12 which accommodates a thin flexible and resilient metal strip 36, preferably of spring steel. Channel 34 may extend to collar 14 so that one end of flexible strip may be attached to the interior of collar 14. The other end of strip 36 is attached to a thin metal plate or disk 38 which normally extends across the interior of tube 12 to form a barrier against the escape of gas fumes. Disk 38 and strip 36 are preferably integrally formed from a single piece of spring steel, with disk 38 normally biased at an obtuse angle relative to strip 36, and consequently also at an obtuse angle relative to the axis of tube 12. The width of strip 36 is slightly less than that of channel 34 so that it can move freely within and through the channel 34. Disk 38 is somewhat oval rather than circular, as best seen in FIG. 4, in order to substantially completely cover the interior of tube 12 despite its inclined position relative to the axis of tube 12. Disk 38 preferably also has a downwardly projecting lip at its free end to reinforce the portion of the disk which will rest against an inserted nozzle.

Figure 3:
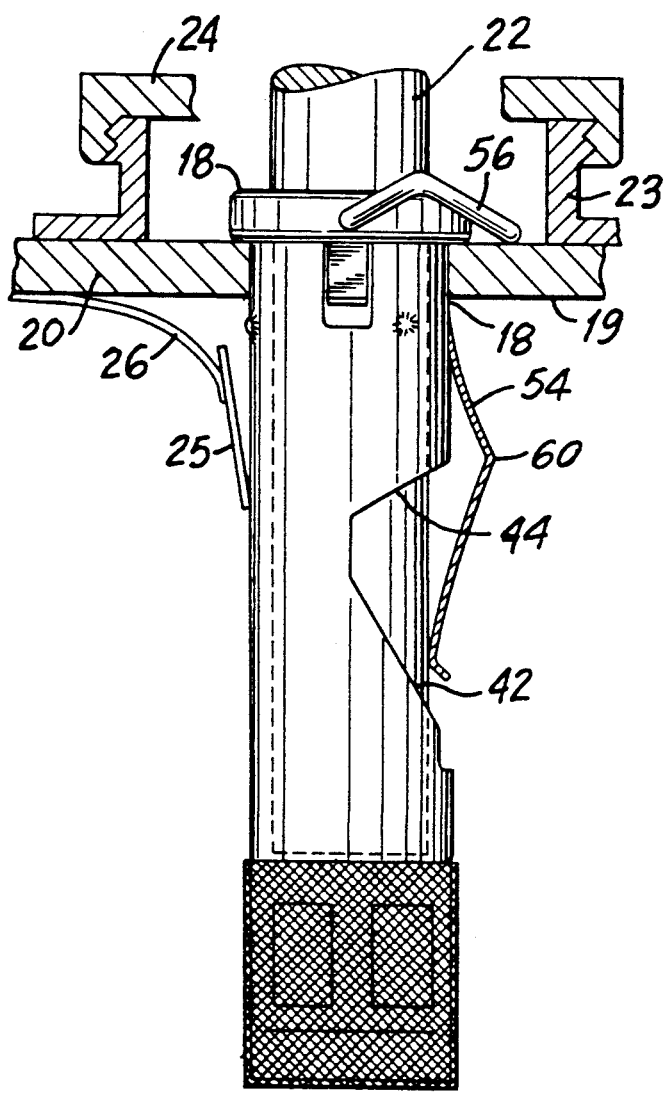
FIGS. 3 & 4 are rectilinearly arranged side views corresponding respectively to FIGS. 1 & 2 and showing the operation of the filtering device with an inserted nozzle.

The body of tube 12 is cut away to form an opening 42 in order to permit the free outward movement of disk 38 when a nozzle 22 is inserted within the device 10, as best shown in FIG. 3. The upper edge 44 defining the top of opening 42 in tube 12 extends at a obtuse angle to the tube axis corresponding to the angle at which disk 38 is supported by strip 36 so that the upper portion of disk 38 normally extends alongside this edge 44. The dimensions of oval disk 38 between strip 36 and the opposite side of tube 12 are made sufficient to substantially close the internal passageway provided by tube 12 when the disk 38 is held in this position alongside the upper edge 44 of opening 42.

Figure 5:
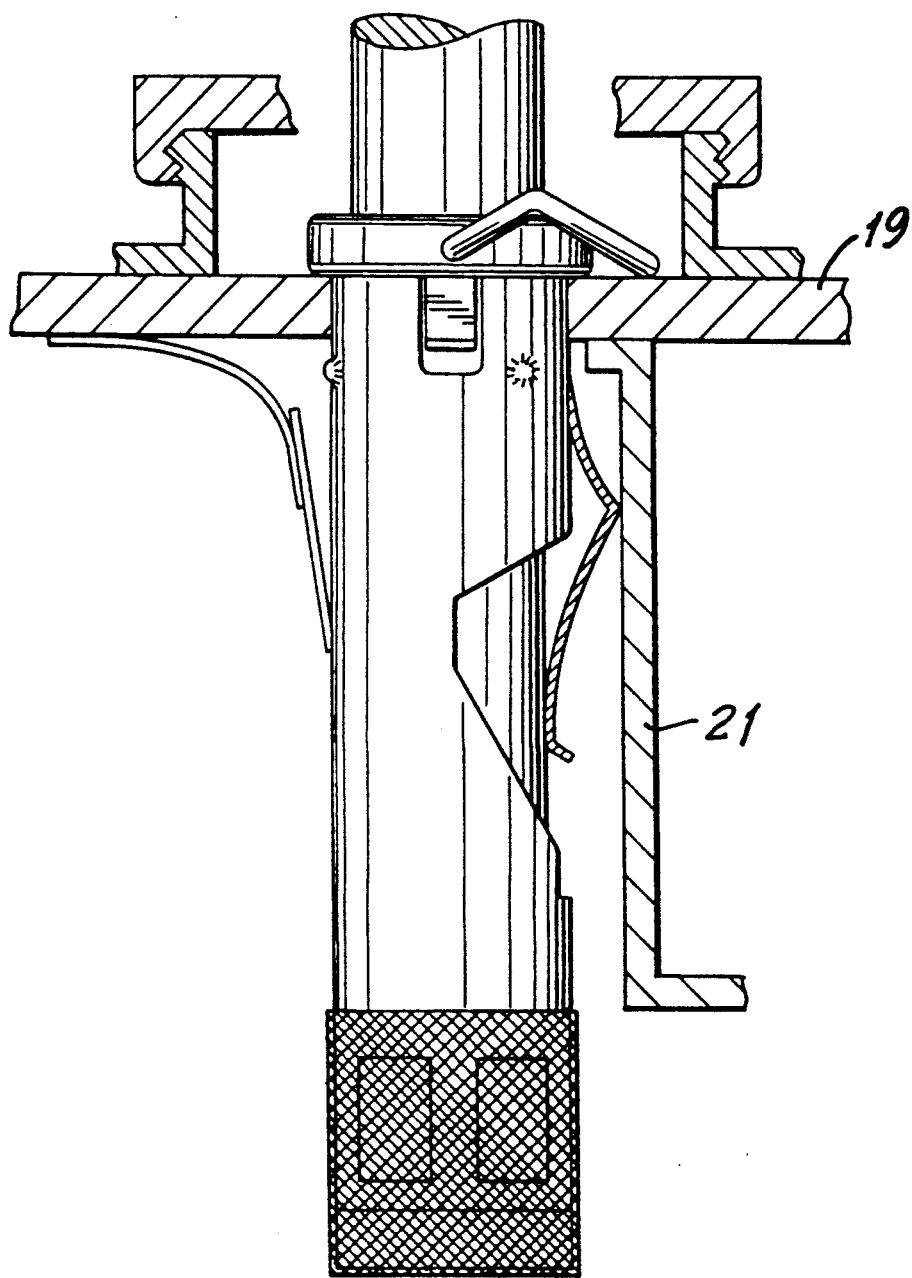
FIG. 5 is a side view of the filtering device corresponding to FIG. 3, but showing the operation of the device when inserted within a gas tank passageway whose diameter is not much greater than that of the device.

In order to form opening 42, tube 12 is cut away to a depth only slightly greater than one half of the diameter of tube 12 in order that a substantial portion 46 of tube 12 remains to give it strength. It will be appreciated that tube 12 must be cut away to a depth of at least one half of the diameter of tube 12 in order to permit the free outward movement of disk 38 through the wall of tube 12. The axial length of the cut away opening 42 need only be sufficient to permit the outward movement of the free end of disk 38 completely across tube 12 under the force of an inserted nozzle, as best shown in FIGS. 4 & 5. Preferably, however, the length of opening 42 is made somewhat larger than the maximum length of disk 38.

In accord with another feature of the invention, means are provide for insuring the retention of the filtering device within the inlet aperture 18 of the vehicle both during and after the filling operation. For these purposes, a few outwardly projecting dimples 48 are formed in tube 12 adjacent collar 14, and a pair of diametrically opposing short L-shaped resilient spring steel strip members 50 are attached to the collar 14 and extend at an angle toward each other within tube 12. However, the free end legs 52 of these L-shaped members 50 extend away from each other toward the interior wall of tube 12. The tube 12 has a pair of diametrically opposed openings 54 which accommodate the passage of the free end legs 52 therethrough when a nozzle 22 is inserted within tube 12, as best shown in FIG. 4.

It will be appreciated that dimples 48 will permit the full insertion and subsequent withdrawal of the filtering device 10 past the rim 19 of the inlet aperture 18 under sufficient manual force, but will prevent the device from passing through the aperture 18 and possibly falling out of the vehicle due to vibration or sudden movement of the vehicle once the device has been fully inserted manually beyond the dimples and up to its collar 14. It will also be appreciated that the projection of free end legs 52 of flexible strips 50 through openings 54 beyond the outer wall of tube 12 under the force of an inserted nozzle 22 will cause these legs 52 to hook under the rim 19 of aperture 18 when the nozzle 22 is being withdrawn from the filtering device 10, and thereby prevent the filtering device 10 from being withdrawn through the inlet aperture 18 together with the nozzle 22.

In order to facilitate the insertion and withdrawal of filtering device 10 through inlet aperture 18, a handle means is provided in the form of a metal loop 56 pivotally mounted at opposite ends to diametrically opposed locations 58 within collar 14. After being used for insertion of the filtering device 10 through aperture 18, loop 56 may be pivoted to rest against the wall 20 of the gas tank to permit the entrance of nozzle 22 as well as to provide a reduced height to the device so as not to interfere with a cover 24 of passageway 23 leading to aperture 18 in some vehicles.

Referring now to FIGS. 3, 4, & 5, the use of filtering device 10 during a gas filling operation will now be described. Filtering device 10 is inserted with the assistance of handle loop 56 through the gasoline inlet aperture 18 until collar 14 rests against the rim 19 of the aperture. In performing such insertion the gasoline cap 24 is removed and the spring-loaded disk 26 covering aperture 18 is pushed aside by the body of the device 10 and until the dimples 48 are forced beyond the rim 19 of aperture 18. It will be appreciated that without nozzle 22 being inserted in device 10, the outer diameter of device 10 throughout its length and u to collar 14 is less than that of aperture 18. Only the dimples 48 protrude beyond the rim 19 of aperture 18. It will also be appreciated that disk 38 generally closes and constitutes a barrier across the interior of tube 12, and thus fulfills the gas fume reducing function previously provided by disc 25. After insertion of device 10, handle loop 56 is pivoted to rest against wall 20 and cap 24 is screwed down over the mouth of passageway 23. Filtering device 10 is then maintained by dimples 48 against any excessive upward or vibrating movement during operation of the vehicle.

During a filling operation, the gas filling nozzle 22 is manually inserted within device 10 past the L-shaped strips 50 and past oval disk 38 until the front edge of nozzle 22 reaches the top surface of the mesh-supporting frame member 28. During such insertion, L-shaped members 50 are forced outwardly so that legs 52 extend through openings 54 beyond the outer wall of tube 12, and oval disk 38 is forced outwardly through opening 42 against the resilient force of metal strip 36, as shown in FIG. 3. Gasoline is then pumped from nozzle 22 through the filtering mesh 3 of device 10 and into the gasoline tank. The L-shaped members 50 and the free end of disk 38 continue to press against the outer surface of nozzle 32 during the filling operation.

When nozzle 22 is withdrawn, oval disk 38 is forced by resilient strip 34 to resume its position closing the interior passage of tube 12, but the filtering device 10 is prevented from being withdrawn together with the nozzle 22 by the hooking of legs 52 under the rim 19 of aperture 18 until the end of nozzle 22 passes the rim 19. After the nozzle 22 is fully withdrawn, device 10 remains within the aperture 18 and gas cap 24 is again screwed down over the gas inlet passageway 23.

Referring now to FIG. 5, a further feature of the filtering device of the invention is shown whereby it may be used in vehicles where the gasoline tank has a further passageway 21 leading to its main gas storage reservoir, and this passageway 21 has a diameter not much greater than that of the gasoline inlet aperture 18. As previously described, flexible strip 36 and oval disk 38 are preferably formed from a single spring steel piece, and the joint 60 between them is spreadable to considerably more than the original obtuse angle under confining forces. Thus, if the distance between this joint 60 and an inserted nozzle 22 is shortened by the existence of this passageway than would normally be the case without this passageway, the strip 36 and disc 38 will merely spread apart an additional amount in order to meet this condition. The free end of oval disk 38 will merely move a greater distance down against nozzle 22 within opening 42 than would be the case as shown by FIG. 3 without the presence of passageway 21. The only functional difference would be that the spring pressure exerted by the free end of disk 38 against nozzle 22 would be correspondingly greater.

A filtering device 10 in accord with the invention thus fulfills the objects previously set forth, and has many further advantages over known devices. Since the nozzle accommodating body of the device is made of a thin metal tube, it can be used where the space between the fuel inlet aperture and its intended fuel filling nozzle, as with unleaded gasoline for motor vehicles, is very small. It incorporates a spring loaded fume inhibiting barrier which normally extends across and blocks the internal passageway of the device, thereby replacing the barrier across the fuel inlet aperture which is pushed aside when the filtering device is initially inserted through the aperture. Since the tube is made of metal it is strong enough to withstand many nozzle insertions even though the tube has an opening which extends at least one half the diameter of the tube in order to accommodate the outward movement of its internal barrier. Since this internal barrier is normally supported by a thin flexible metal strip at an obtuse angle relative thereto, the angle between them may be increased as the barrier is forced outwardly by the insertion of a nozzle, and may be even further increased if the joint between the barrier and strip meets the wall of an adjacent fuel tank passageway.

Means are also provided for maintaining the filtering device fully inserted within the fuel inlet aperture and for preventing the device from being withdrawn back out of the aperture whenever a previously inserted nozzle is being withdrawn from the device. The depth of insertion of a nozzle within the device is also limited in order to protect the filtering means, and a handle is provided for insertion and withdrawal of the device through a fuel inlet aperture, which handle may be pivoted aside so as not to interfere with an inserted nozzle or with the adjacent cover of an inlet passageway.

Although a particular embodiment of the invention has been described, many modifications can be made, and it is intended by the appended claims to cover all such modification which generally fall within a broad interpretation of the scope of the language employed.

What is claimed is:

1. A fuel filtering device for insertion within a fuel inlet aperture of a fuel tank comprising,
   a thin elongated metal tube having one end open for receiving a fuel filling nozzle and having filtering means covering its other end, said tube having a further opening in the body thereof,
   a fume reducing barrier member,
   a thin, flexible and resilient metal strip extending parallel to the axis of said tube having one end attached to said barrier member, and having its other end attached to said device at a location between said open end and said body opening of said tube,
   said barrier member being normally supported by said strip in a position through said body opening and transverse to the interior of said tube and being dimensioned to substantially close the internal passageway provided by said tube, and
   said body opening being large enough to permit the outward movement of said barrier member through the body of said tube against the resilient force of said strip when a fuel filling nozzle is inserted within said tube beyond said barrier member.

2. The fuel filtering device of claim 1 wherein said tube is made of steel and said barrier member is a thin metal disk.

3. The fuel filtering device of claim 2 wherein said disk and strip are integrally formed from a single piece of resilient metal.

4. The fuel filtering device of claim 3 wherein said resilient metal is spring steel.

5. The fuel filtering device of claim 2 wherein said disk has an oval shape and is supported by said strip at an obtuse angle transverse to the axis of said tube.

6. The fuel filtering device of claim 2 wherein said device has an outwardly projecting collar around said open end of said tube, and said tube has circumferentially spaced outwardly projecting dimples formed therein near said collar to help retain said device within said inlet aperture. body opening extends to a depth slightly more than one-half the inner diameter of said tube.

7. The fuel filtering device of claim 1 wherein said body opening extends to a depth slightly more than one-half the inner diameter of said tube.

8. The fuel filtering device of claim 1 wherein said filtering means comprises an cylindrical frame having openings therein and having a fuel-filtering mesh covering the outer surface of said frame and openings, said frame being attached to said other end of said tube coaxial therewith and having an inner diameter less than the inner diameter of said tube to prevent an inserted nozzle from penetrating said tube beyond the top of said frame.

9. The fuel filtering device of claim 1 wherein said device has an outwardly projecting collar around the open end of said tube, and said tube has a channel axially extending from said collar within which said flexible strip is located, said other end of said strip being attached to said collar, and said channel having a width slightly larger than said strip whereby said strip can move freely therewithin.

10. The fuel filtering device of claim 1 wherein said device has an outwardly projecting collar around the open end of said tube to limit the penetration of said tube within said fuel inlet aperture, and has handle means pivoted in said collar for aiding the insertion and removal of said device through said aperture, said handle means being pivotable out of the way of a fuel filling nozzle inserted within said tube.

11. The fuel filtering device of claim 1 wherein said device has an outwardly projecting collar around said open end of said tube, and has means adjacent said collar extending beyond the exterior surface of said tube when a fuel filling nozzle is inserted within said tube for preventing the withdrawal of said device from within said fuel inlet aperture when said nozzle is withdrawn.

12. The fuel filtering device of claim 1 wherein said device has an outwardly projecting collar around said open end of said tube, and has a pair of diametrically opposed resilient metal members each having two legs forming an L-shape with the end of one leg attached to the interior of said collar, said L-shaped members being angularly disposed toward each other within said tube with their other free legs directed toward the inner surface of said tube, said tube having diametrically opposed openings aligned with said free legs through which said legs may be moved to project beyond the exterior of said tube when a fuel filling nozzle is inserted within said tube, said projecting legs serving to prevent the withdrawal of said device from within said fuel inlet aperture when said nozzle is withdrawn.

* * * * *